United States Patent
Horianopoulos et al.

(10) Patent No.: US 7,629,698 B2
(45) Date of Patent: Dec. 8, 2009

(54) TRAFFIC-ACTUATED ELECTRICAL GENERATOR APPARATUS

(76) Inventors: Dimitrios Horianopoulos, Georgiou Pandreou 30-32, Agii Anargiri Attkis, Athens (GR) 135-62; Stefanos Horianopoulos, 182 Autumn Crescent, Welland, Ontario (CA) L3C 7K2

( * ) Notice: Subject to any disclaimer, the term of this patent is extended or adjusted under 35 U.S.C. 154(b) by 379 days.

(21) Appl. No.: 11/252,780

(22) Filed: Oct. 19, 2005

(65) Prior Publication Data

US 2007/0085342 A1   Apr. 19, 2007

(51) Int. Cl.
| | |
|---|---|
| F02B 63/04 | (2006.01) |
| F03G 7/08 | (2006.01) |
| H02K 7/18 | (2006.01) |
| B60L 11/02 | (2006.01) |
| B61C 9/38 | (2006.01) |
| F04B 9/00 | (2006.01) |
| F04B 35/00 | (2006.01) |

(52) U.S. Cl. ............... 290/1 R; 290/45; 417/229
(58) Field of Classification Search ......... 290/1 R, 290/45; 417/229
See application file for complete search history.

(56) References Cited

U.S. PATENT DOCUMENTS

| | | | | |
|---|---|---|---|---|
| 159,660 | A | | 2/1875 | Faivre ................. 417/229 |
| 1,391,503 | A | | 9/1921 | Register ............... 417/229 |
| 1,771,200 | A | | 7/1930 | Akers ................. 417/229 |
| 1,916,873 | A | * | 7/1933 | Wiggins ................ 185/39 |
| 2,020,361 | A | * | 11/1935 | Johnston ............... 417/214 |
| 2,060,890 | A | | 11/1936 | Olafson ................. 92/94 |
| 2,333,614 | A | | 11/1943 | Boyd ................. 417/229 |
| 3,088,417 | A | * | 5/1963 | Johnston ............... 417/229 |
| 3,803,422 | A | | 4/1974 | Krickler ................ 290/52 |
| 3,944,855 | A | | 3/1976 | Le Van .................. 310/69 |
| 4,004,422 | A | | 1/1977 | Le Van .................. 60/533 |
| 4,081,224 | A | | 3/1978 | Krupp ................. 417/229 |
| 4,173,431 | A | | 11/1979 | Smith ................. 417/229 |
| 4,212,598 | A | * | 7/1980 | Roche et al. ............ 417/229 |
| 4,238,687 | A | * | 12/1980 | Martinez ............... 290/1 R |
| 4,239,974 | A | * | 12/1980 | Swander et al. .......... 290/1 R |
| 4,239,975 | A | * | 12/1980 | Chiappetti ............. 290/1 R |
| 4,322,673 | A | | 3/1982 | Dukess ................. 322/35 |
| 4,339,920 | A | * | 7/1982 | Le Van .................. 60/533 |

(Continued)

FOREIGN PATENT DOCUMENTS

CA        1044566        12/1978

(Continued)

OTHER PUBLICATIONS

Supplemental European Search Report issued Sep. 11, 2008 in corresponding European application No. 06 79 0862.

*Primary Examiner*—Nicholas Ponomarenko
*Assistant Examiner*—Pedro J Cuevas
(74) *Attorney, Agent, or Firm*—Hamre, Schumann, Mueller & Larson, P.C.

(57) ABSTRACT

A traffic-actuated power generating apparatus includes a low pressure fluid supply reservoir, a high pressure fluid accumulator, and at least one energy collection device positioned in the path of oncoming traffic to be actuated thereby and pump fluid from the reservoir to the accumulator upon actuation. The energy collection device can be housed in a pad adapted to rest on a traffic-conveying surface, and fluid from the accumulator can be used to drive an electrical power generator.

20 Claims, 5 Drawing Sheets

U.S. PATENT DOCUMENTS

| | | | | |
|---|---|---|---|---|
| 4,409,489 A * | 10/1983 | Hayes | | 290/1 R |
| 4,418,542 A * | 12/1983 | Ferrell | | 60/668 |
| 4,437,015 A * | 3/1984 | Rosenblum | | 290/1 R |
| 4,614,875 A * | 9/1986 | McGee | | 290/1 R |
| 4,739,179 A * | 4/1988 | Stites | | 290/1 R |
| 4,980,572 A * | 12/1990 | Sen | | 290/1 R |
| 5,157,922 A * | 10/1992 | Baruch | | 60/325 |
| 5,355,674 A * | 10/1994 | Rosenberg | | 60/325 |
| 5,634,774 A * | 6/1997 | Angel et al. | | 417/229 |
| 6,091,159 A * | 7/2000 | Galich | | 290/1 R |
| 6,172,426 B1 * | 1/2001 | Galich | | 290/1 R |
| 6,204,568 B1 * | 3/2001 | Runner | | 290/1 R |
| 6,353,270 B1 * | 3/2002 | Sen | | 290/1 R |
| 6,362,534 B1 * | 3/2002 | Kaufman | | 290/1 R |
| 6,376,925 B1 * | 4/2002 | Galich | | 290/1 R |
| 6,734,575 B2 * | 5/2004 | Ricketts | | 290/1 R |
| 6,756,694 B2 * | 6/2004 | Ricketts | | 290/1 R |
| 6,767,161 B1 * | 7/2004 | Calvo et al. | | 404/71 |
| 6,858,952 B2 | 2/2005 | Gott et al. | | 290/1 R |
| 6,860,674 B2 | 3/2005 | Solon | | 404/15 |
| 6,936,932 B2 | 8/2005 | Kenney | | 290/1 R |
| 6,949,840 B2 * | 9/2005 | Ricketts | | 290/1 R |
| 2003/0132636 A1 * | 7/2003 | Ricketts | | 290/1 R |
| 2003/0132637 A1 * | 7/2003 | Ricketts | | 290/1 R |
| 2004/0130158 A1 * | 7/2004 | Kenney | | 290/1 R |
| 2005/0001430 A1 * | 1/2005 | Ricketts | | 290/1 R |
| 2005/0200132 A1 * | 9/2005 | Kenney | | 290/1 R |
| 2006/0001267 A1 * | 1/2006 | Ricketts | | 290/1 R |
| 2006/0006653 A1 * | 1/2006 | Ricketts | | 290/1 R |

FOREIGN PATENT DOCUMENTS

| | | |
|---|---|---|
| CA | 2476554 A1 | 7/2003 |
| CA | 2396926 | 2/2004 |
| GB | 2 290 115 A | 12/1995 |
| GB | 2 408 074 A | 5/2005 |
| KR | 1020040051448 | 9/2006 |

* cited by examiner

TRAFFIC-ACTUATED ELECTRICAL GENERATOR APPARATUS

FIELD OF THE INVENTION

The present invention relates to a traffic-actuated electrical generator apparatus in which energy from a passing vehicle is used to provide a supply of pressurized fluid which can be used to drive a generator.

BACKGROUND OF THE INVENTION

U.S. Pat. No. 2,333,614 (Boyd) discloses a pump system having air-compressing cups that are secured in an inverted orientation to metallic plates anchored in the pavement. Movement of a vehicle across the cup causes the cup to collapse, forcing air from the cup into a compressed air storage tank, which can then be used to perform useful work.

U.S. Pat. No. 4,004,422 (Le Van) discloses a method and apparatus for producing useful work by utilizing the weight of moving traffic by incorporating in a roadway or traffic-way a readily deformable chamber which is filled with a fluid arranged so that the weight of a vehicle in passing thereof affects a displacement of the fluid therein. The energy of the displaced fluid in turn is translated into mechanical or electrical energy.

U.S. Pat. No. 4,322,673 (Dukess) discloses an energy conservation and highway safety apparatus for supplying supplemental or emergency electrical power caused by passage of vehicles over the apparatus comprising a plurality of elongated conduits having a plurality of pressure responsive pumping elements mounted therein. The conduits are connected through an accumulator to an air motor which drives a generator.

SUMMARY OF THE INVENTION

The present invention provides an apparatus in which energy of a passing vehicle is converted into a supply of pressurized fluid which can be used to perform work, such as driving a generator to produce electrical power. In some embodiments, the apparatus can provide a pad over which wheels of a vehicle can pass, the pad including cylinders to be actuated by the passing wheels. The pad can lie on a road surface so that damage or modification to the road surface is minimized. The pad can be portable, and the pad can take the form of a speed bump or speed hump.

According to a first aspect, the present invention provides a traffic actuated power generating apparatus including a low pressure fluid supply reservoir, a high pressure fluid accumulator, an electrical power generator driven by fluid from the accumulator and at least one energy collection device positioned in the path of a passing vehicle to be actuated thereby and pump fluid from the reservoir to the accumulator upon actuation. The at least one energy collection device is housed in an energy collection pad adapted to rest on a roadway.

The energy collection pad can have a generally compression-resistant body, with a bottom surface adapted to bear against a roadway surface, and a top surface spaced vertically above the bottom surface and adapted to be driven over by a wheel of a passing vehicle. The energy collection devices can include a cylinder with a piston mounted therein, and the pad can have respective pockets in which the energy devices are installed. Each of the energy collection devices can be provided with an actuator for moving the piston from a retracted to an advanced position with a respective cylinder, the actuator having an upper contact surface positioned proud of the top surface of the pad when the piston is in the retracted position.

The energy collection pad can include a plurality of channels, the channels receiving inlet conduits and delivery conduits, the inlet conduits providing fluid communication between the reservoir and respective inlet ports of the cylinders, and the delivery conduits providing fluid communication between the accumulator and respective exhaust ports of the cylinders. The pad can include a plurality of access apertures to facilitate connection of the inlet conduits and delivery conduits to the intake and exhaust ports, respectively. The access apertures can include slots that are open to the bottom surface of the pad, and that provide space linking together at least a portion of each respective pocket and at least one of the channels. The pad can be provided with an intake coupling in fluid communication with the inlet conduits and an outlet coupling in fluid communication with the delivery conduits to facilitate detachable connection of the pad to the reservoir and accumulator. The top surface of the pad can be generally of an inverted parabolic shape to provide a speed bump. The pad can have leading and trailing ramp portions, and a generally flat central portion between the ramp portions. The accumulator can include a pair of air-over-oil tanks.

According to another aspect of the present invention, a method for harnessing energy from passing traffic includes providing an energy collection pad with a plurality of energy collection devices housed therein, each energy collection device having a cylinder with intake and exhaust ports and a piston coupled to an actuator, the actuator extending above an upper surface of the pad; deploying the pad on a roadway surface; coupling the intake ports to low pressure fluid supply reservoir and the exhaust ports to high pressure fluid accumulator; and directing traffic to travel over the pad, the traffic engaging the actuators so that fluid is pumped from the reservoir to the accumulator, the accumulator storing energy in the form of high pressure fluid.

According to another aspect of the present invention, an energy collection pad for harnessing energy from passing traffic is provided with a body having a bottom surface configured to bear against a traffic conveying surface and a top surface spaced apart from the bottom surface and configured to be engaged by passing traffic; and a plurality of energy collection devices housed in the body for converting kinetic energy from passing traffic to potential energy in the form of pressurized fluid.

The energy collection devices of the pad can include a cylinder with a piston mounted therein, and the pad body can have a plurality of pockets for receiving respective ones of the cylinders. The pad body can be generally compression resistant, and can be of recycled rubber. The top surface can have leading and trailing ramp portions to guide traffic onto and off of the top surface of the pad. The energy collection devices can include actuators for actuating the pistons, and some or all of the actuators can extend proud of the ramp portions of the top surface of the energy collection pad.

BRIEF DESCRIPTION OF THE DRAWINGS

For a better understanding of the present invention, and to show more clearly how it may be carried into effect, reference will now be made, by way of example, to the accompanying drawings which illustrate aspects of embodiments of the present invention and in which.

DETAILED DESCRIPTION OF THE INVENTION

Figure 1:
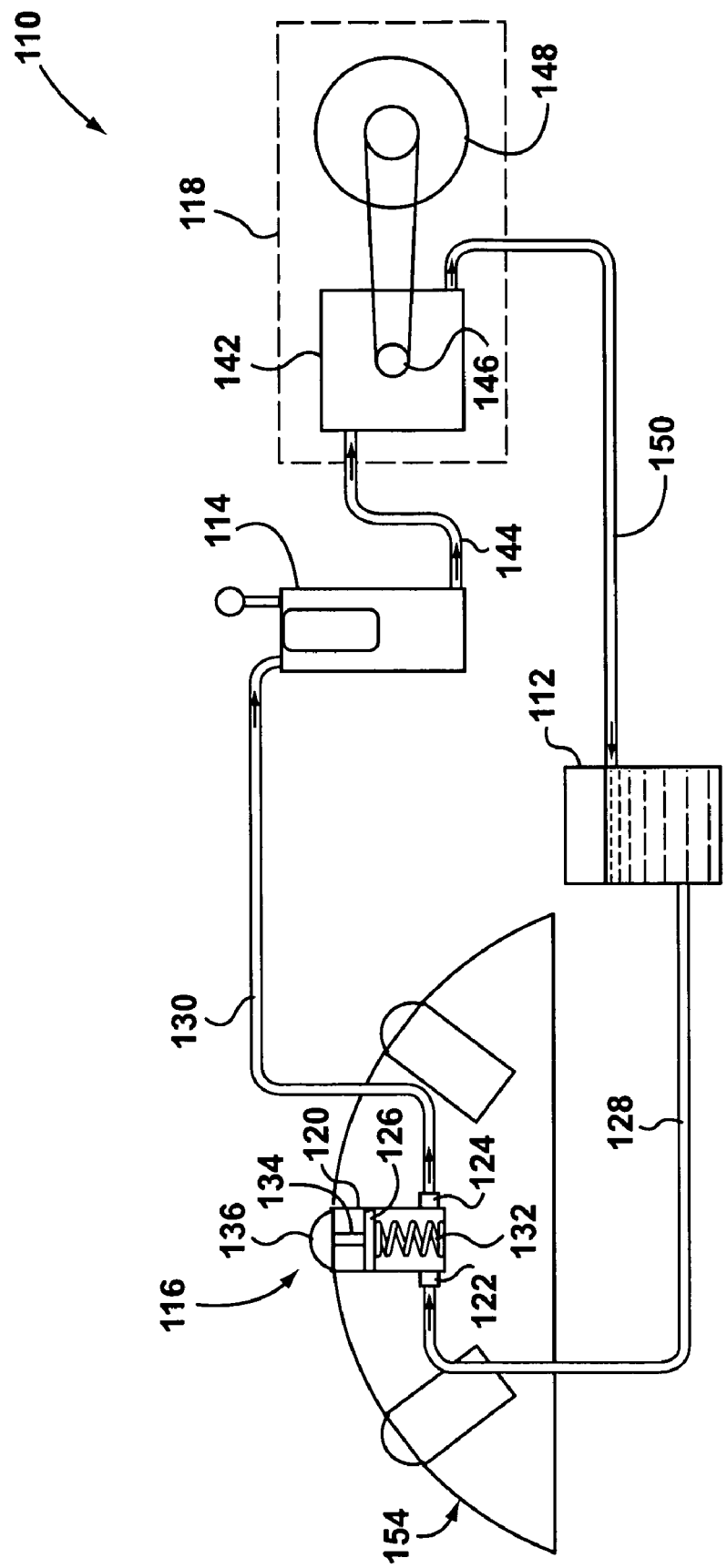
FIG. 1 is a schematic diagram of a traffic-actuated power generating apparatus in accordance with the present invention.

A traffic-actuated power generating apparatus 110 in accordance with the present invention is shown in schematically in FIG. 1. The apparatus 110 includes a low pressure fluid supply reservoir 112, a high pressure fluid accumulator 114, and at least one pumping device 116 to be actuated by a passing vehicle so that fluid is pumped from the reservoir 112 to the accumulator 114. The apparatus 110 further includes, in the embodiment illustrated, an electrical generator 118 driven by high pressure fluid from accumulator 114.

The pumping device 116 can serve as, and may also be referred to herein as, an input energy collection device. Input energy, in the form of kinetic energy of passing vehicles, is collected by activation of the device 116 (as described subsequently herein) and is converted to potential energy in the form of pressurized fluid delivered to the accumulator 114. The fluid can be generally incompressible and can be stable over a wide range of operating temperatures. In the embodiment illustrated, the fluid is hydraulic oil.

In the embodiment illustrated, the pumping device 116 includes at least one cylinder 120 having an inlet port 122, an exhaust port 124, and a piston 126. The piston 126 is slidable within the cylinder 120 between a retracted position (raised position in FIG. 1) and an advanced (or lowered) position. When the piston 126 moves from the advanced to the retracted position, the pumping device 116 can draw fluid from the supply reservoir 112 into the cylinder 120 via an inlet conduit 128 coupling the reservoir 112 to the inlet port 122 of the cylinder 120. When the piston 126 moves from the retracted to the advanced position, the pumping device 116 can deliver pressurized fluid to the accumulator 114 via a delivery conduit 130 coupling the accumulator 114 to the exhaust port 124 of the cylinder 120. One-way valves (not shown) can be provided in the respective conduits 128 and 130 to prevent back flow of pressurized fluid from the cylinder 120 and accumulator 114, respectively.

For controlling the position of the piston 126 in the cylinder 120, the cylinder 120 can be provided with a return biasing element 132 that can be in the form of a spring urging the piston 126 to the retracted (raised) position. To move the piston 126 to the advanced position, an actuator 134 can be coupled to the piston 126. The actuator 134 can include an upper contact surface 136 adapted to be engaged by a wheel of a vehicle passing over the pumping device 116. The force of the wheel against the contact surface 136 can force the actuator 134 and piston 126 downwards, against the force of the spring 132. In the embodiment illustrated, the contact surface 136 is curved (convex when viewed from above) to provide gentle engagement with a vehicle wheel rolling onto or off of the surface 136.

The accumulator 114 provides a supply of pressurized fluid that can be used to perform useful work. In the embodiment illustrated, this useful work is to generate electricity via the generator 118. The electricity produced by the generator 118 can be fed into the area's electrical grid, or can be used to power local, isolated electricity consuming devices. The generator 118 includes a fluid-powered motor portion 142 that receives pressurized fluid from the accumulator 114 via a supply conduit 144. The motor portion 142 has an output shaft 146 coupled to an alternator portion 148 of the generator 118. A return conduit 150 conveys the spent (depressurized) fluid from the generator 118 back to the supply reservoir 112.

The accumulator 114 is generally configured to provide a steady output supply of pressurized fluid to the motor portion 142 of the generator 118. The accumulator 114 will generally receive high pressure fluid from the devices 116 in a fluctuating or pulsing stream, in response to cyclical engagement and release of the actuators 134. To further facilitate providing a steady, smooth supply of pressurized fluid, the accumulator 114 can include two separate tanks, the first tank receiving fluid from the devices 116, and providing a first-stage smoothing of fluid delivery to the second tank, which in turn provides a second stage smoothing of fluid delivery to the generator 118. An example of such a configuration is described subsequently herein.

Figure 2:
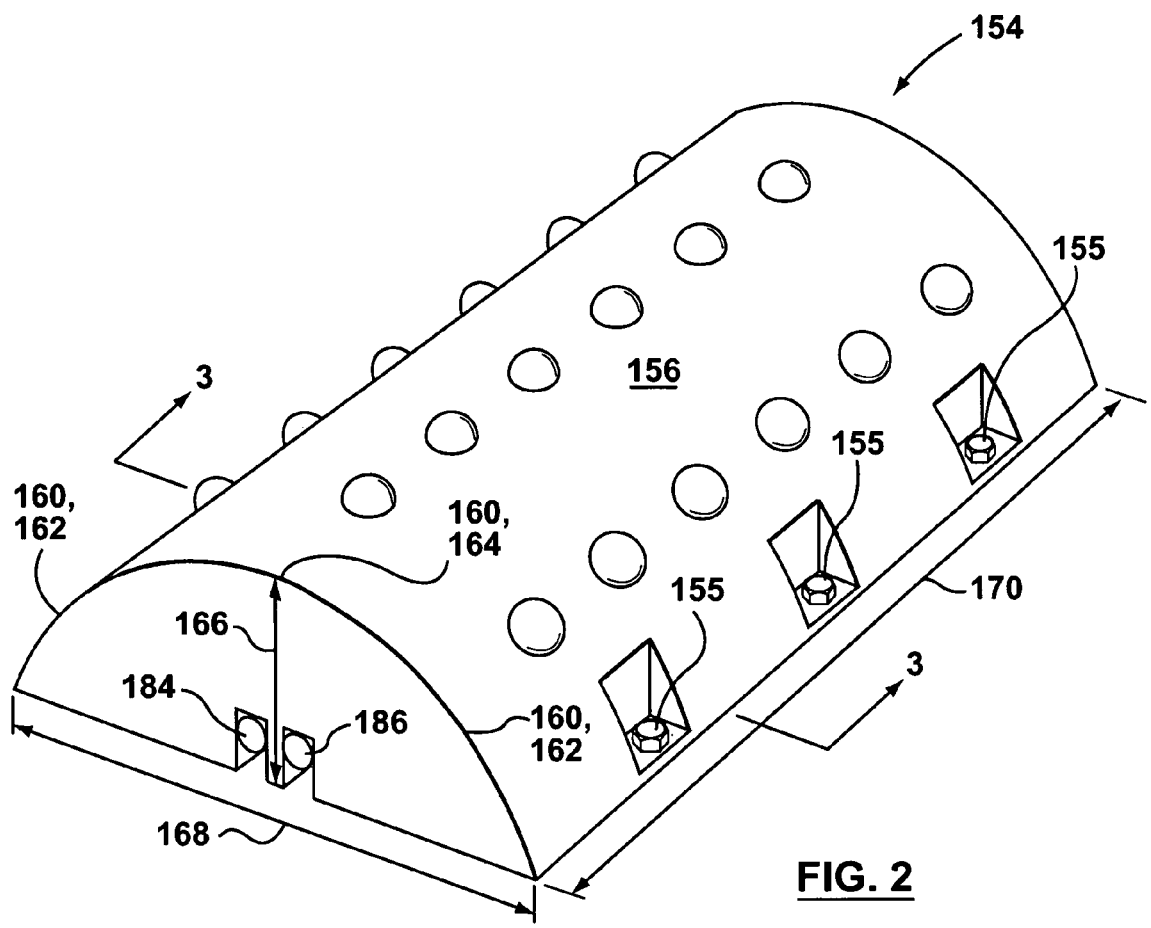
FIG. 2 is a perspective view of a pad element of the apparatus of FIG. 1.
Figure 3:
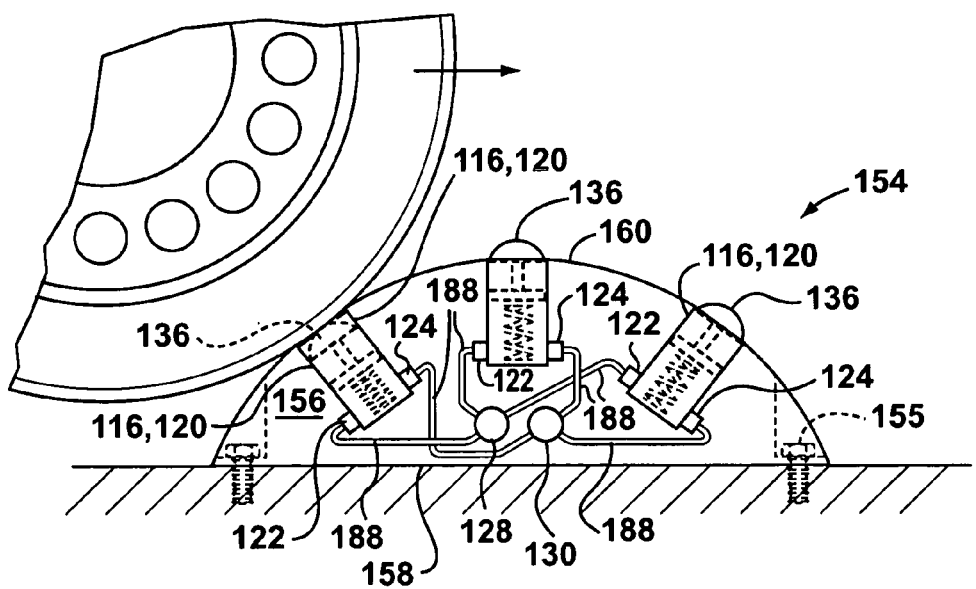
FIG. 3 is a cross-sectional view of the apparatus of FIG. 2, taken along the lines 3-3.

To facilitate providing the pumping device 116 in a satisfactory position for actuation by a passing vehicle, the pumping or energy collection device 116 can be provided in an energy collection pad 154, an embodiment of which is shown in FIGS. 2 and 3. The energy collection pad 154 has a generally solid body portion 156 with a bottom surface 158 configured to bear against a traffic conveying surface (such as, for example, a roadway or parking lot surface) and an upper surface 160 configured to be driven over by wheels of a passing vehicle. Providing the energy collection devices 116 (and associated conduits) in the pad 154 can reduce or eliminate the need to rework or modify a paved roadway to accommodate the apparatus 110. The pad 154 can have fastener receptors 155 for optionally anchoring the pad 154 to a roadway surface.

The body 156 can be of a tough, relatively compression-resistant material such as, for example, but not limited to, a high density rubber. In the embodiment illustrated, the body 156 is of a rubber material made from recycled tires. The bottom surface 158 can be generally flat to rest squarely on a finished roadway surface. The top surface 160 can have (in cross-section) a generally inverted parabolic shape, and the energy collection pad 154 can serve as speed bump to slow traffic down in parking lots, school zones, or when approaching toll-collection zones.

In the embodiment illustrated, the top surface 160 of the collection pad 154 has an inverted parabolic shape, with leading and trailing ramp portions 162 disposed on either side of a crest portion 164. The crest portion 164 generally defines the height 166 of the pad body 156. The body 156 has a length 168 (extending in the direction of travel of a vehicle over the ramps 162 and crest 164) and a width 170 (extending across a traffic lane, normal to the direction of travel). In the embodiment illustrated, the height 166 is about 75 mm to about 100 mm, the length 168 is about 300 mm, and the width 170 is about 1.5 m. Some or all of the upper contact surfaces 136 of the actuators 134 can be positioned relative to the pad body to protrude from the ramp portions 162 of the top surface 160. Engagement of the actuators 134 along the ramp portions 162 can provide more efficient energy collection and less noticeable engagement of the actuators.

The pad 154 can be configured to have a plurality of the energy collection devices 116 mounted therein. In the embodiment illustrated, the body 156 has a plurality of pockets 172 that open to the upper surface 160 and that are shaped to receive a respective cylinder 120 therein.

Each pocket 172 has a depth 174 that is sufficient to accommodate the axial extent of the respective cylinder 120. Further, the depth of each pocket 172 is sized so that when a respective cylinder 120 is fully inserted therein, a central, uppermost portion 176 of the upper contact surface 136 of the actuator 134 is proud of (or protrudes above) the top surface 160 by an amount generally equal to the stroke length of the piston 126 in the cylinder 120. A peripheral portion 178 of the convex contact surface 136 can be generally aligned with the top surface 160 of the pad 154 to facilitate smooth engagement and disengagement of the actuator 134 by a passing wheel.

The pad 154 can have openings in the underside 158 to accommodate the conduits 128 and 130 and connecting tubes 188 for connection to respective ports 122 and 124. An intake and outlet coupling 184 and 186 can be provided at the side of the pad 154 to facilitate connection of the reservoir 112 and accumulator 114 to the conduits 128 and 130, respectively.

Figure 4:
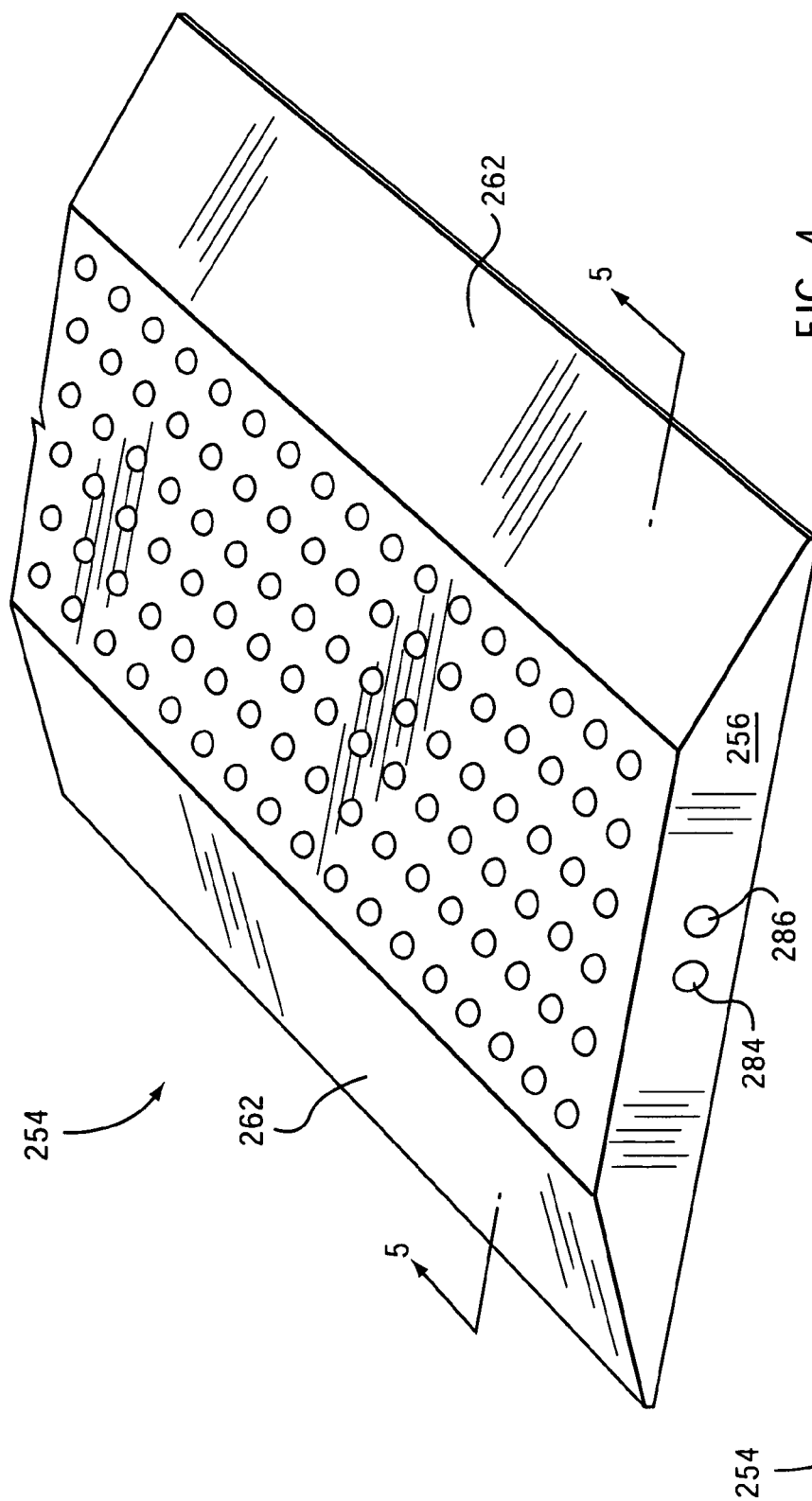
FIG. 4 is a perspective view of an alternative pad element for use with the apparatus of FIG. 1.
Figure 5:
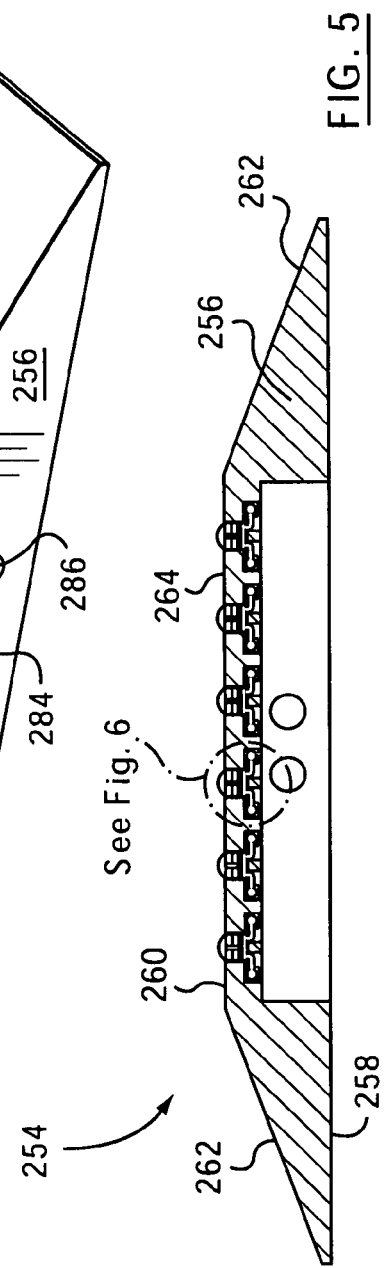
FIG. 5 is a cross-sectional view of the pad element of FIG. 4, taken along the lines 5-5.

An alternate embodiment of an energy collection pad 254 is generally illustrated in FIGS. 4 and 5. The energy collection pad 254 is similar to the pad 154, and like features are identified by like reference characters, incremented by 100.

The energy collection pad 254 has a generally solid body portion 256 with a bottom surface 258 and an upper surface 260. The top surface 260 is adapted to be driven over by a passing vehicle, and has leading and trailing ramp portions 262 and a crest portion 264. The crest portion 264 can be substantially longer (in the direction of travel of a passing vehicle) than the ramp portions 262, and can be slightly curved (to form a speed hump) or can be generally flat to provide an elevated surface upon which wheels of a passing vehicle can travel. The ramps 262 can facilitate a gentle transition for a wheel traveling onto or off of the pad 254 relative to the roadway.

Figure 6:
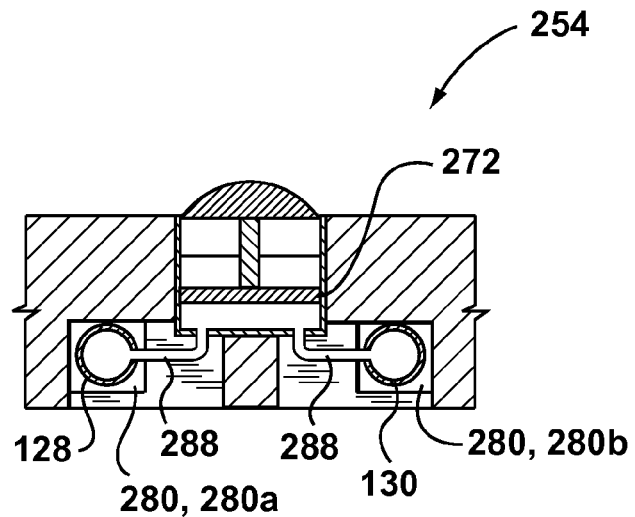
FIG. 6 is an enlarged view of a portion of FIG. 5.
Figure 7:
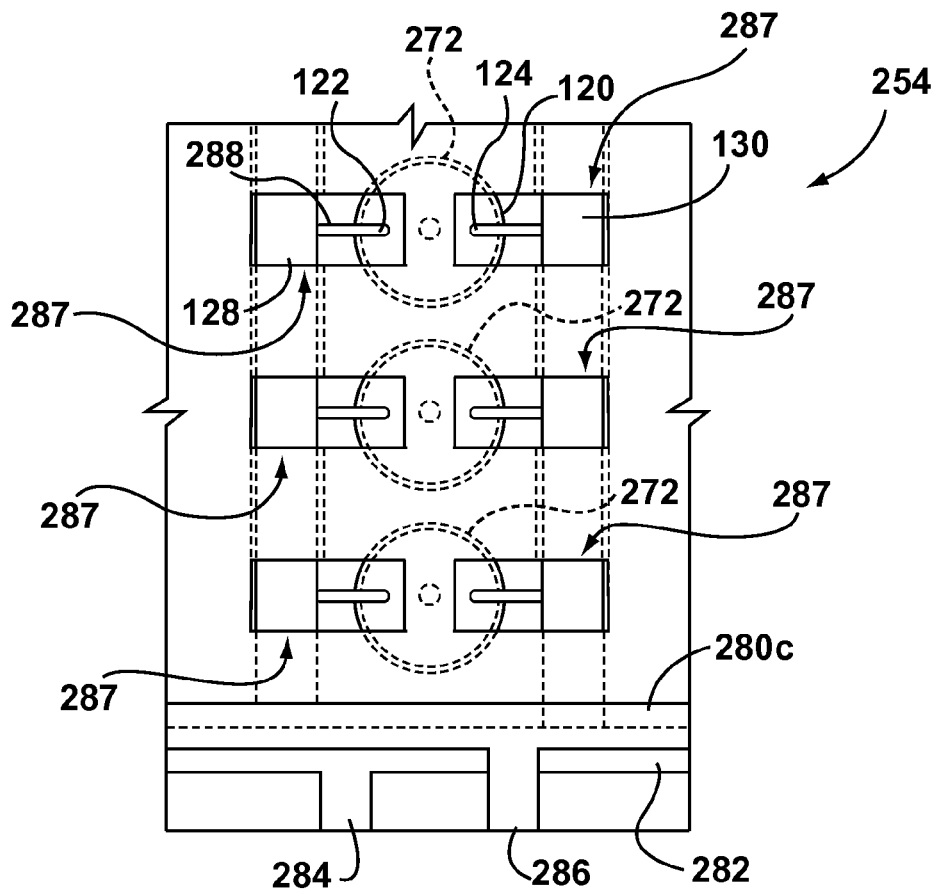
FIG. 7 is an underside view of a portion of the pad element of FIG. 4.

The pad 254 has internal pockets 272 and channels 280 to accommodate cylinders 120 and associated conduits, respectively. Details of the pockets 272 and channels 280 can be seen in FIGS. 6 and 7. In the embodiment illustrated, one channel 280 extends widthwise on either side of a transverse row of pockets 272. One of the channels 280a receives an inlet conduit 128 and the other channel 280b receives a delivery conduit 130. A further channel 280c can be provided lengthwise along an edge of the pad 254, intersecting the channels 280a and 280b. The channel 280c can accommodate one or more headers 282, respective ones of which can connect together the separate inlet conduits 128, and the separate delivery conduits 130, respectively. An intake coupling 284 and an outlet coupling 286 can be provided at the side of the pad 254, each in fluid communication with the intake conduits 128 and conduits 130, respectively, via respective headers 282.

The pad 254 is, in the embodiment illustrated, further provided with a series of apertures 287 in its underside surface 258. Each aperture 287 is open to the bottom surface 258, and is sized and shaped to intersect one of the pockets 272 and a channel 280 on one side of the pocket 272. The apertures 287 can facilitate connecting the ports 122, 124 to a respective conduit 128, 130 via connecting tubes 288. The pad 254 can be manufactured in an injection moulding process, and the pockets 272 and channels 280 can be integrally formed in the mould.

Figure 8:
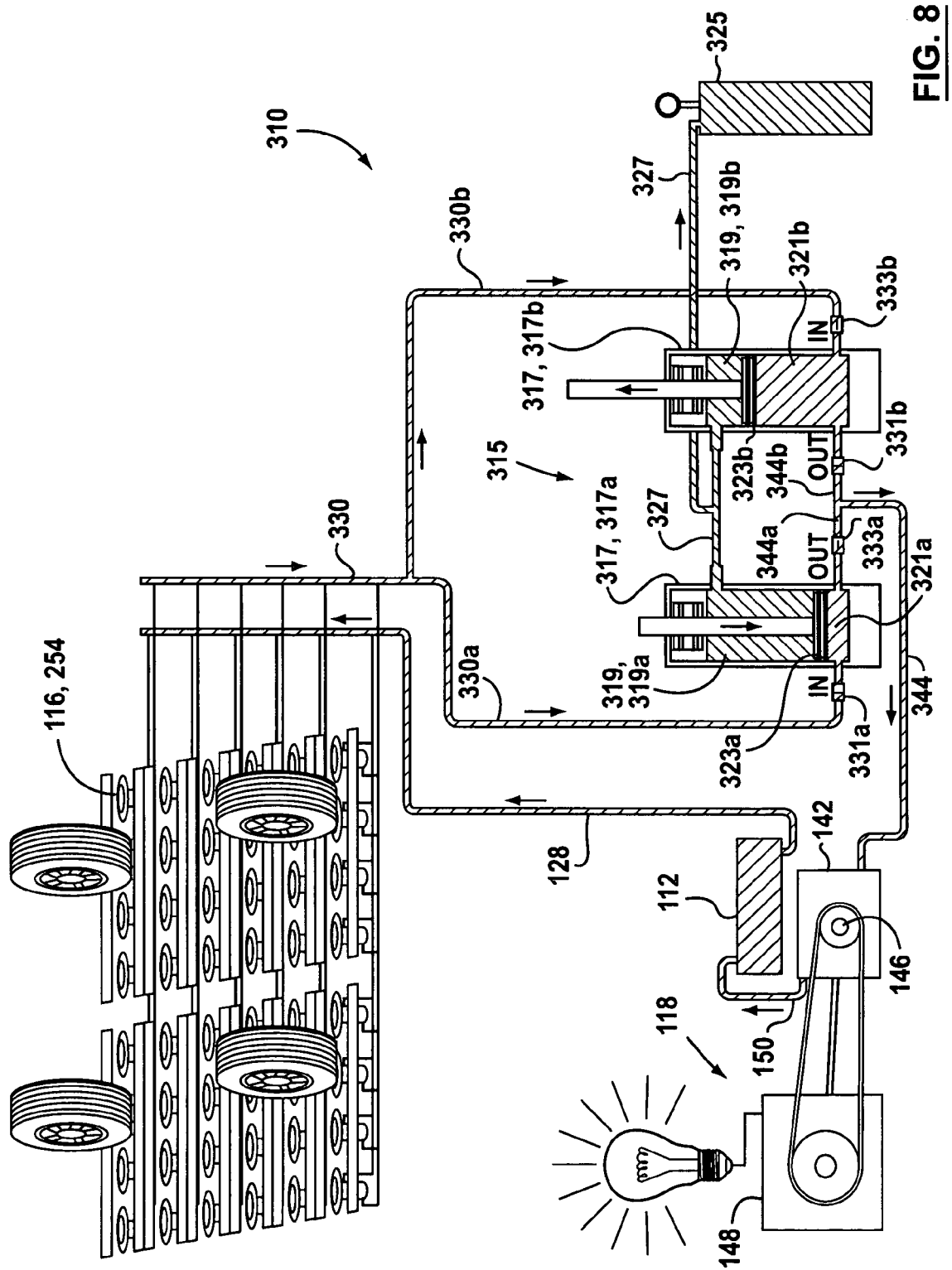
FIG. 8 is a schematic diagram of an alternate embodiment of a traffic-actuated power generating apparatus according to the present invention.

Referring now to FIG. 8, an alternate embodiment of a traffic-actuated power generating apparatus 310 is schematically illustrated. The apparatus 310 is similar to the apparatus 110, and like features are identified by like reference characters.

The apparatus 310 includes a pulsation dampening system 315 that generally replaces the accumulator 114 of apparatus 110. The pulsation dampening system includes a pair of air-over-oil accumulators 317, uniquely identified as accumulators 317a and 317b. Each air-over-oil accumulator 317 has an upper air chamber 319 and a lower oil chamber 321 separated by a piston 323. The air chambers 319 are adapted to contain pressurized air supplied from an air tank 325 via air conduit 327. The oil chambers 321 receive high pressure fluid from devices 116 (of energy pad 254 in the embodiment illustrated) via respective delivery conduits 330a and 330b. The oil chambers 321 have respective oil outlet ports for delivering high pressure oil to the hydraulic motor 142 via supply conduits 344a, 344b.

To control the flow of oil into and out of the oil reservoirs 321, the accumulators 317 are provided with respective intake valves 331a, 331b and outlet valves 333a, 333b. Each valve 331, 333 is movable between open and closed positions, and can be electrically controlled (e.g. by a solenoid).

In use, the accumulators 317a and 317b alternately fill up with oil received from the devices 116, and dispense oil to the hydraulic motor 142. For example, in FIG. 8, the intake valve 331b is closed, and the outlet valve 333b is open, so that oil from conduit 330b can enter the oil chamber 321b of tank 317b. This forces piston 323b upwards, which in turn forces air from air chamber 319b into air chamber 319a via conduit 327.

In the accumulator 317a, the inlet valve 331a is closed, and the outlet valve 333a is open. The entry of air into the air chamber 319a urges the piston 323a downwards, forcing oil from the oil chamber 321a, through conduit segment 344a and conduit 344, to the hydraulic motor 142.

In the configuration described above, the tank 317b serves as an oil input tank, and the tank 317a serves as an oil delivery tank. Once the piston 323a reaches the bottom of the tank 317a (i.e. oil chamber 321a is at its smallest volume), the positions of each of the four valves 331a, 333a, 331b, and 333b can be reversed, thereby reversing the roles of the tanks 317a, 317b and the directions of travel of the respective pistons 321a, 321b.

While the above description provides an example embodiment, it will be appreciated that the present invention is susceptible to modification and change without departing from the fair meaning and scope of the accompanying claims. Accordingly, what has been described is merely illustrative of the application of aspects of an embodiment of the invention. Numerous modifications and variations of the present invention are possible in light of the above teachings. It is therefore to be understood that within the scope of the appended claims, the invention may be practiced otherwise than as specifically described herein.

As an example of a modification, the present invention can be adapted for actuation by pedestrians, and can be placed in an area of high pedestrian traffic—e.g. on walkways in malls, busy sidewalks, etc. Such an adaptation can include using cylinders (in the energy collection devices) with shorter stroke lengths and/or smaller diameters, to facilitate actuation by a user's foot. Additionally or alternatively, the pads 154, 254 can be modified to include an electrically resistive heating web mounted adjacent the respective top surfaces 160, 260 and connected to receive electrical power from the generator 118. The heating web can be activated in cold climates to melt snow and/or ice. Melting of the snow and/or ice can ensure operability of the apparatus 110, 310 and can provide improved road safety along stretches of roads such as, for example, at corners, intersections, or along bridges.

In other embodiments, the apparatus 110, 310 can be used to perform work other than generate electricity. For example, the accumulator can drive a hydraulic motor that is coupled to an air compressor. The air compressor can provide a source of pressurized air that can be used to power air tools, for example.

Alternatively, or additionally, the devices 116 can draw in low-pressure air, and deliver high-pressure air to an accumulator. This can eliminate the conversion of energy from compressed oil (or liquid) to compressed air where the apparatus 110, 310 is configured to provide a supply of compressed air. The ambient air (in communication with the intake ports of the devices 116) can serve as a low-pressure fluid supply reservoir.

In some embodiments, the devices 116 can be adapted for placement along a railway for actuation by passing trains. In such applications, the devices 116 can be mounted in an energy collection pad that is relatively narrow (having only one or two devices across its width) and extends lengthwise alongside a length of the rail. The actuators can include a rigid bar or metal strap that straddles (in width) an upper portion of the rail and the upper contact surface 136, so that as a train passes, its wheels engage the strap and thereby actuate the devices 116.

It is to be understood that what has been described are preferred embodiments of the invention. The invention nonetheless is susceptible to certain changes and alternative embodiments without departing from the subject invention, the scope of which is defined in the following claims.

We claim:

1. A traffic-actuated power generating apparatus comprising:
  a) a low pressure fluid supply reservoir;
  b) a high pressure fluid accumulator;
  c) an electrical power generator driven by fluid from the accumulator;
  d) a plurality of energy collection devices positioned in the path of a passing vehicle to be actuated thereby and pump fluid from the reservoir to the accumulator upon actuation; and
  e) a body having a bottom surface that bears against a traffic-conveying surface and a top surface spaced vertically above the bottom surface, the plurality of energy collection devices mounted in the body, and each of the energy collection devices positioned entirely above the traffic-conveying surface when the bottom surface of the body bears the traffic-conveying surface.

2. The apparatus of claim 1 wherein each of the plurality of energy collection devices comprises a cylinder with a piston mounted therein, and the body includes respective pockets in which the energy collection devices are installed.

3. The apparatus of claim 2 wherein each of the energy collection devices includes an actuator for moving the piston from a retracted to an advanced position with a respective cylinder, the actuator having an upper contact surface positioned proud of the top surface of the body when the piston is in the retracted position.

4. The apparatus of claim 2 wherein the body further comprises a plurality of channels, the channels receiving inlet conduits and delivery conduits, the inlet conduits providing fluid communication between the reservoir and respective inlet ports of the cylinders, and the delivery conduits providing fluid communication between the accumulator and respective exhaust ports of the cylinders.

5. The apparatus of claim 4 wherein the body further comprises a plurality of access apertures to facilitate connection of the inlet conduits and delivery conduits to the intake and exhaust ports, respectively.

6. The apparatus of claim 5 wherein the access apertures comprise slots that are open to the bottom surface of the body, and that provide space linking together at least a portion of each respective pocket and at least one of the channels.

7. The apparatus of claim 4 wherein the body is provided with an intake coupling in fluid communication with the inlet conduits and an outlet coupling in fluid communication with the delivery conduits to facilitate detachable connection of the body to the reservoir and accumulator.

8. The apparatus of claim 2 wherein the top surface of the body is generally of an inverted parabolic shape to provide a speed bump.

9. The apparatus of claim 1 wherein the top surface of the body comprises leading and trailing ramp portions, and a generally flat central portion between the ramp portions.

10. The apparatus of claim 1 wherein the accumulator comprises a pair of air-over-oil tanks.

11. A method for harnessing energy from passing traffic comprising:
  a) providing a body with a bottom surface and a top surface and with a plurality of energy collection devices housed therein, each energy collection device having a cylinder with intake and exhaust ports and a piston slidable within the cylinder and coupled to an actuator, the cylinder positioned between the bottom and top surfaces of the body, and;
  b) deploying the body on a traffic-conveying surface with the bottom surface of the body bearing against the traffic-conveying surface;
  c) coupling the intake ports to a low pressure fluid supply reservoir and the exhaust ports to a high pressure fluid accumulator; and
  d) directing traffic to travel over the body, the traffic engaging the actuators so that fluid is pumped from the reservoir to the accumulator, the accumulator storing energy in the form of high pressure fluid.

12. An energy collection pad for harnessing energy from passing traffic comprising:
  a) a body having a bottom surface configured to bear against a traffic conveying surface and a top surface spaced apart from the bottom surface and configured to be engaged by passing traffic; and
  b) a plurality of energy collection devices housed in the body for converting kinetic energy from passing traffic to potential energy in the form of pressurized fluid.

13. The energy collection pad of claim 12 wherein each of the plurality of energy collection devices comprises a cylinder with a piston mounted therein, and the body includes a plurality of pockets for receiving respective ones of the cylinders.

14. The energy collection pad of claim 12 wherein the body is generally compression resistant.

15. The energy collection pad of claim 12 wherein the body comprises recycled rubber.

16. The energy collection pad of claim 13 wherein the top surface comprises leading and trailing ramp portions to guide traffic onto and off of the top surface of the body.

17. The energy collection pad of claim 16 wherein the energy collection devices include actuators extending proud of the leading and trailing ramp portions of the top surface of the body.

18. The apparatus of claim 12 wherein each of the energy collection devices is positioned entirely above the traffic-conveying surface when the bottom surface of the body bears against the traffic-conveying surface.

19. The apparatus of claim 12 wherein each one of the plurality of energy collection devices comprises a cylinder with a piston slidably mounted therein, each cylinder disposed generally between the top and bottom surfaces of the body.

20. The apparatus of claim 19 wherein each cylinder comprises an inlet port for receiving low pressure fluid into the respective energy collection device, and an exhaust port for delivering high pressure fluid from the respective energy collection device, each intake port and exhaust port having a respective intake conduit and exhaust conduit coupled thereto, each of the intake and exhaust ports and intake and delivery conduits being disposed at an elevation between the top and bottom surfaces of the body.

* * * * *